United States Patent
Huttner

(10) Patent No.: US 10,598,536 B1
(45) Date of Patent: Mar. 24, 2020

(54) SELF-LEVELING MEASURING CUP

(71) Applicant: Jaz Innovations, LLC, Toledo, OH (US)

(72) Inventor: James Huttner, Sylvania, OH (US)

(73) Assignee: JAZ INNOVATIONS, LLC, Toledo, OH (US)

( * ) Notice: Subject to any disclaimer, the term of this patent is extended or adjusted under 35 U.S.C. 154(b) by 0 days.

(21) Appl. No.: 16/295,029

(22) Filed: Mar. 7, 2019

Related U.S. Application Data

(60) Provisional application No. 62/639,531, filed on Mar. 7, 2018.

(51) Int. Cl.
*G01F 19/00* (2006.01)
*A47J 43/28* (2006.01)
*B65D 77/24* (2006.01)

(52) U.S. Cl.
CPC ........... *G01F 19/002* (2013.01); *A47J 43/28* (2013.01); *B65D 77/24* (2013.01); *G01F 19/007* (2013.01)

(58) Field of Classification Search
CPC ...... G01F 19/00; G01F 19/002; G01F 19/007; B65D 77/24
USPC .......................................................... 73/426
See application file for complete search history.

(56) References Cited

U.S. PATENT DOCUMENTS

| | | | |
|---|---|---|---|
| 439,432 A * | 10/1890 | Schoch | B26B 3/04 30/128 |
| 464,393 A * | 12/1891 | Scheid | G01F 19/002 73/426 |
| 1,348,591 A * | 8/1920 | Shutterly | A61J 7/0046 73/426 |
| 2,042,945 A | 6/1936 | LeMay | |
| 2,259,504 A * | 10/1941 | Wilson | G01F 19/002 73/426 |
| 2,396,943 A * | 3/1946 | Frank | A61J 7/0023 73/429 |
| 2,459,466 A * | 1/1949 | Spreen | G01F 19/002 73/426 |
| 2,630,014 A * | 3/1953 | Chester | G01F 19/002 73/429 |
| 3,001,404 A | 9/1961 | McDonnell, Jr. et al. | |
| 3,049,926 A * | 8/1962 | Victor | G01F 19/002 73/429 |
| 4,283,951 A * | 8/1981 | Varpio | G01F 19/00 222/356 |
| D541,004 S * | 4/2007 | Berg | D18/3.1 |
| 9,863,799 B2 * | 1/2018 | Bagley | G01F 19/002 |
| 2019/0078923 A1* | 3/2019 | Rivera | G01F 19/002 |

FOREIGN PATENT DOCUMENTS

JP 2006234408 A * 9/2006

OTHER PUBLICATIONS

Dreamfarm LEVUPS scrape level measuring cups, prior to Mar. 7, 2018.
Dreamfarm LEVOONS scrape level measuring spoons, prior to Mar. 7, 2018.

* cited by examiner

*Primary Examiner* — Jamel E Williams
(74) *Attorney, Agent, or Firm* — Marshall & Melhorn, LLC

(57) ABSTRACT

A measuring cup includes a scraper bar that is slide-ably affixed to the upper edges of the side walls of the measuring cup, allowing a user to simply slide the scraper bar forward and backward to scrape any excess granular foodstuff back into a bulk container, leaving a true and accurate amount of foodstuff inside the measuring cup.

7 Claims, 4 Drawing Sheets

SELF-LEVELING MEASURING CUP

BACKGROUND OF THE INVENTION

When cooking or baking, it is often necessary to add a specific amount of a particular ingredient to ensure the correct flavor and consistency of the final result. This is especially true in baking, where the various ingredients, such as flour, sugar, salt, and leavening agents must be added in the correct proportions to achieve the rise and texture desired in the finished product.

When measuring granular foodstuffs, such as flour and sugar, the measuring cup is dredged in the container holding the bulk foodstuff and filled. This results in the filled measuring cup having a mounded surface. To maintain consistency in measurement it is advisable to use a flat surface such as the back of a knife to scrape across the measuring cup to remove this extra mounded material. Failure to do so would yield a measure of the dry foodstuff that is greater than the stated amount of the measuring cup, potentially resulting in a failed baking attempt.

Most cooks follow the practice of scraping across the top of the measuring cup with a straight flat surface, as described above. This, however, requires the cook to seek out and use a separate utensil for this purpose, leading to increase in effort and the number of soiled utensils requiring cleanup at the end of the baking process.

SUMMARY OF THE INVENTION

The current invention seeks to address this problem by providing a measuring cup having a sliding scraper bar that is slide-ably affixed to the side rims of the measuring cup, allowing the cook to simply slide the scraper bar forward and backward to scrape the excess granular foodstuff back into the bulk container, leaving a true and accurate amount of foodstuff inside the measuring cup.

BRIEF DESCRIPTION OF THE DRAWINGS

The advantages of the invention will become readily apparent to those skilled in the art from the following detailed description of various embodiments when considered in the light of the accompanying drawings, in which.

DETAILED DESCRIPTION OF THE INVENTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

Figure 1:
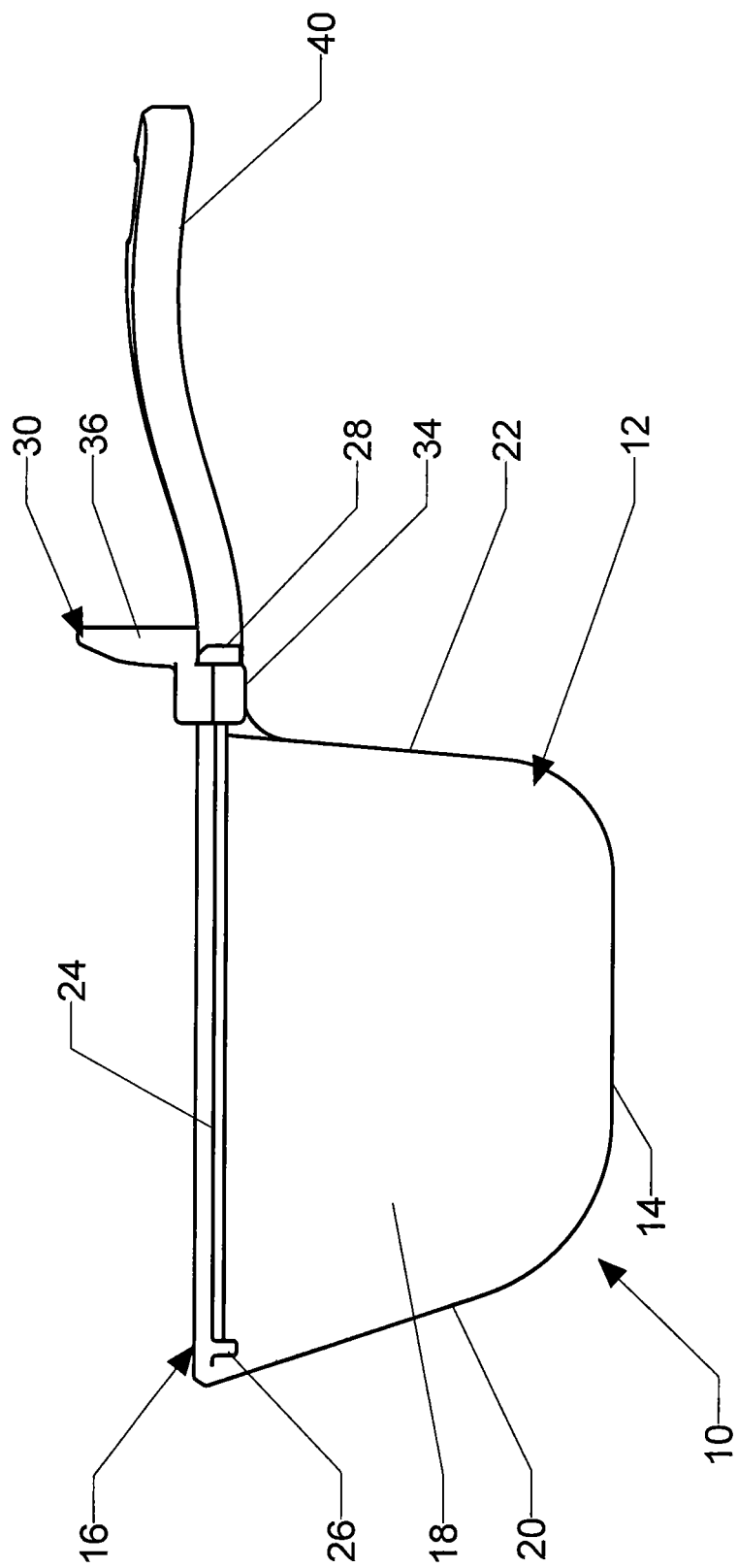
FIG. 1 is a side view a measuring cup in accordance with a preferred embodiment of the invention.

A preferred embodiment of the self-leveling measuring cup 10 of a preferred embodiment of the invention is illustrated in FIG. 1. The measuring cup 10 of the invention includes a measurement or cup portion 12 that, in a preferred embodiment, generally defines a trapezoidal prism having a generally rectangular horizontal cross-section. In the preferred embodiment, the lower face 14 of the trapezoidal prism is solid and forms the base or bottom wall of the measurement portion 12 of the measuring cup 10, whereas the upper face defines the opening 16 of the measurement portion 12 for receiving the foodstuff to be measured. In a preferred embodiment, the lower face 14 is smaller in area than the upper opening 16 of the measurement portion 12 of the measuring cup 10.

It is further preferable for the side walls 18 of the measurement portion 12 to be generally parallel to each other, while the front wall 20 and rear wall 22 may be generally parallel to each other, or the front wall 20 may angle away from the rear wall 22 as it extends from the lower face 14 to the opening 16, as shown in FIG. 1. The side walls 18, front wall 20 and rear wall 22 together form the side faces of the generally trapezoidal prism shape of the measuring portion 12 of the measuring cup 10.

Figure 2:
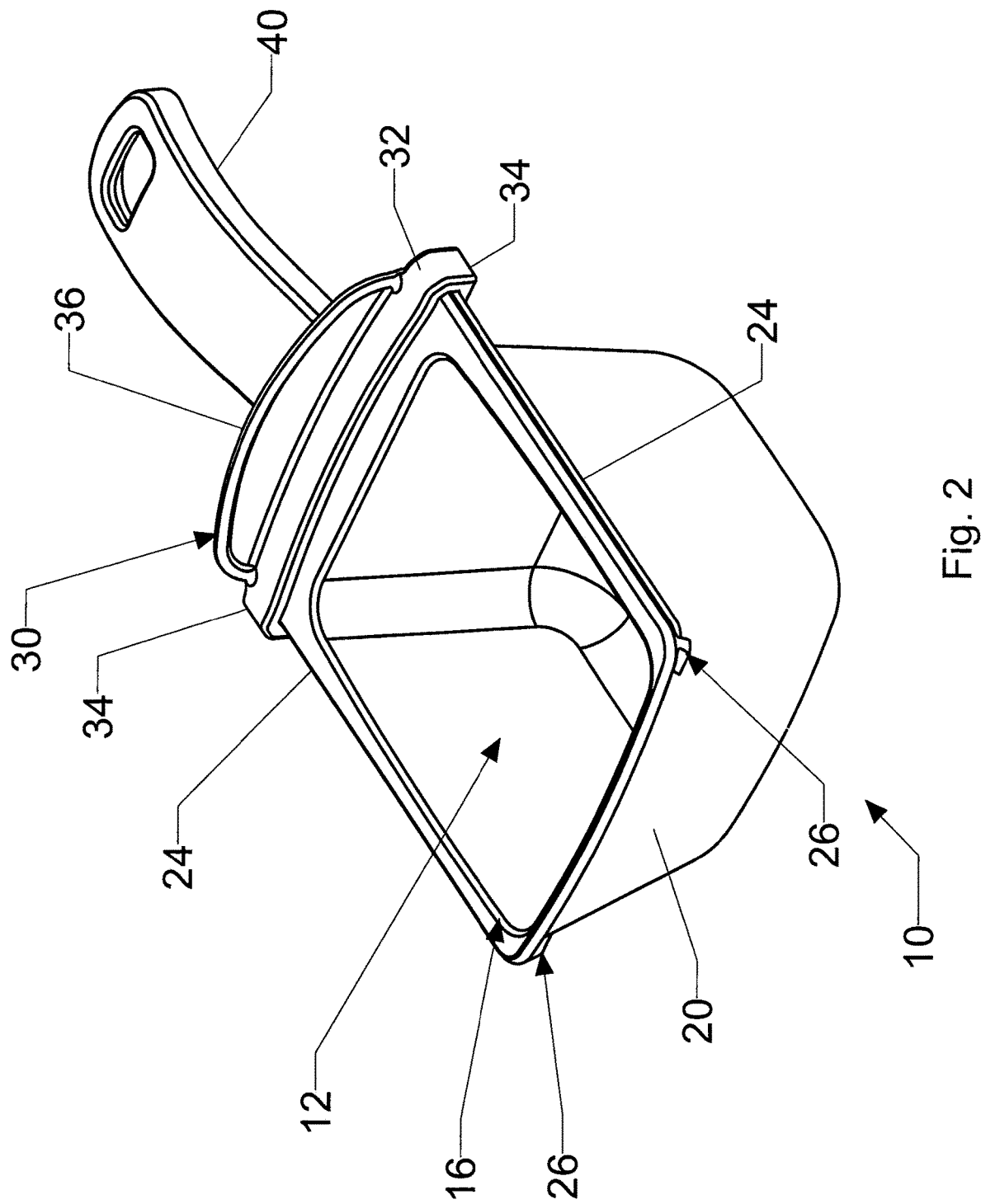
FIG. 2 is a perspective view of the measuring cup of FIG. 1.
Figure 3:
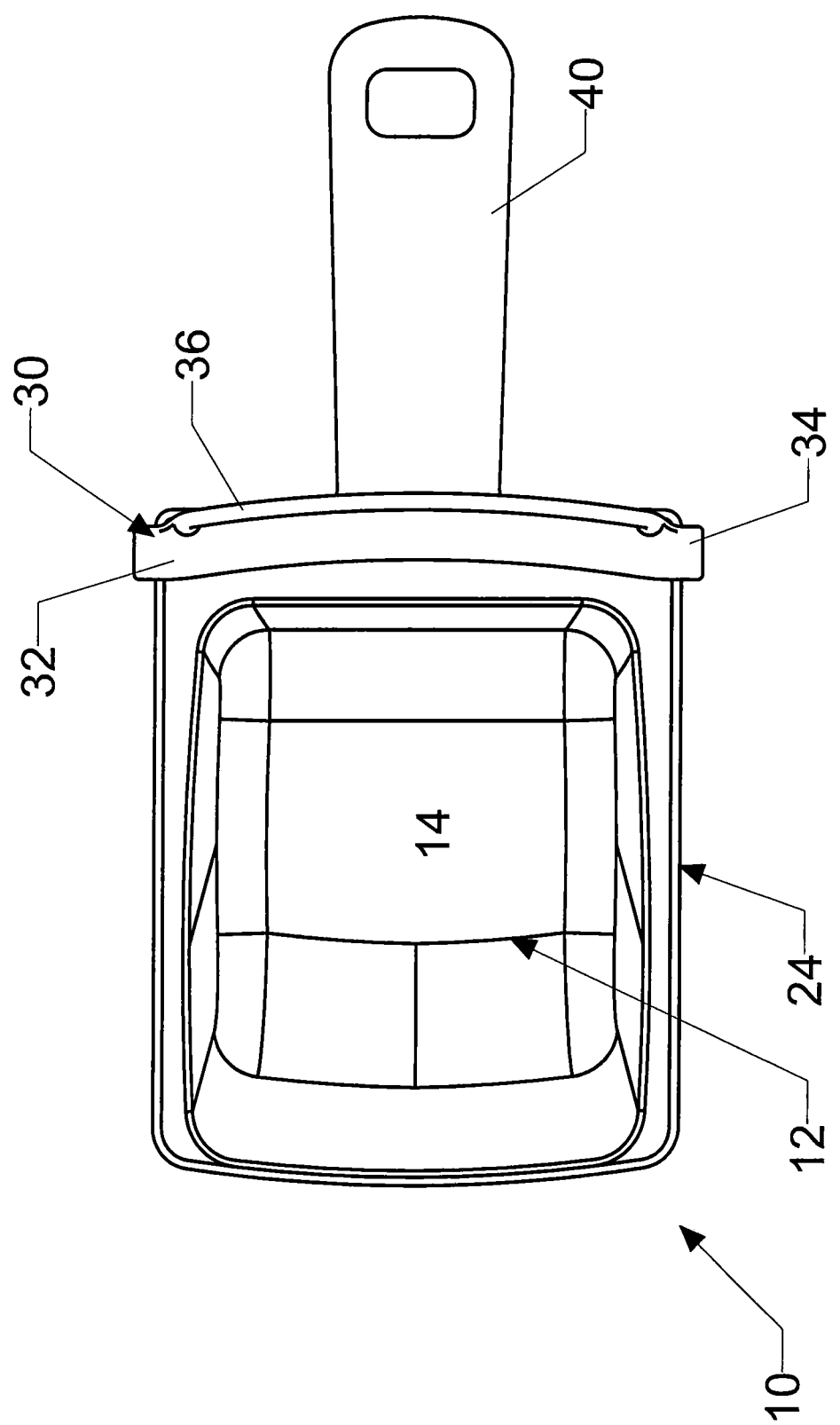
FIG. 3 is a plan view of the measuring cup of FIG. 1.

At least a portion of each of the upper edges 24 of the two side walls 18 is provided with an enlarged bead. Preferably, the upper edges 24 of the side walls 18 are provided with beads that run the length of the respective side wall 18. These beads have a configuration that engages a respective mating receiving feature in the scraper bar 30 described below. At the front and rearmost portion of at least one and preferably both of the beads is a change in the configuration of the bead that acts as a physical stop to prevent the scraper bar 30 from sliding off of or becoming disengaged from the upper edges 24 measuring portion 12. Thus, in the preferred embodiment illustrated in FIGS. 1-3, a pair of front stops 26 and a pair of rear stops 28 are provided on the respective upper edges 24 of the side walls 18. In alternate embodiments not shown, front and rear stops may extend upwardly from the front wall 20 and rear wall 22 to engage the scraper bar 30.

To enable the cook or other user of the measuring cup 10 to scrape off excess foodstuff that extends above the opening 16 of the measuring portion 12, the scraper bar 30 is slidingly engaged with the beads running along the upper edges 24 of the two side walls 18. In the preferred embodiment illustrated in FIGS. 1-3, the scraper bar 30 is perpendicularly oriented relative to the length of the measurement portion 12, spanning the width of the measurement portion 12 and having a receiving configuration at each end designed to engage with the beads running along the upper edges 24 of the two side walls 18. In the preferred embodiment illustrated in the drawings, each end of the scraper bar 30 is provided with a downwardly extending hook 34 which wraps around the bead formed on the associated upper edge 24. When properly engaged, the scraper bar 30 sits atop the upper edges 24 of the two side walls 18 of the measurement portion 12 in a manner that allows it to slide easily forward and back along the upper edges 24 of the two side walls 18. This arrangement thus allows translational movement of the scraper bar 30, both frontward and rearward, while restricting other movement of the scraper bar 30 relative to the measuring cup 30. The stops 26 and 28 prevent translation movement of the scraper bar 30 beyond the front wall 20 and the rear wall 22, respectively.

As the scraper bar 30 has a straight, flat bottom 32, it serves as a simple and convenient means of scraping away excess foodstuff extending above the opening 16 of the measurement portion 12 of the measuring cup 10 as it is slid from the front to the back or from the back to the front of the measurement portion 12. This allows the user a simple and easy way to measure and deliver a consistent amount of foodstuff each time. Preferably, a scraper bar grip 36 extends upwardly from the straight, flat bottom 32 of the scraper bar, providing the user with a convenient place to grasp the scraper bar 30.

Figure 5:
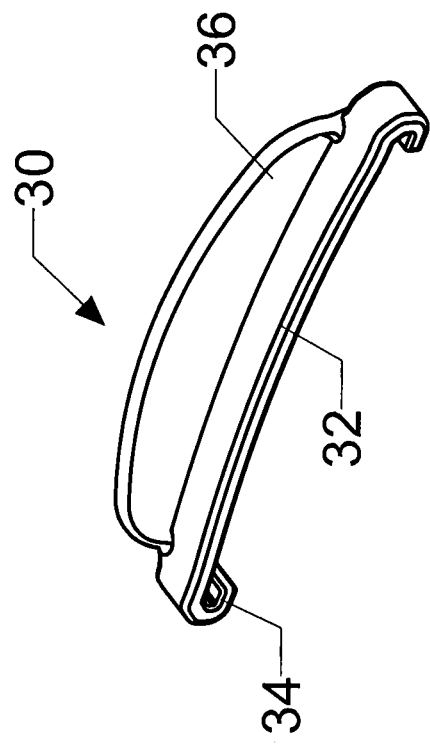
FIG. 5 is a perspective view of the scraper bar of FIG. 4.
Figure 4:
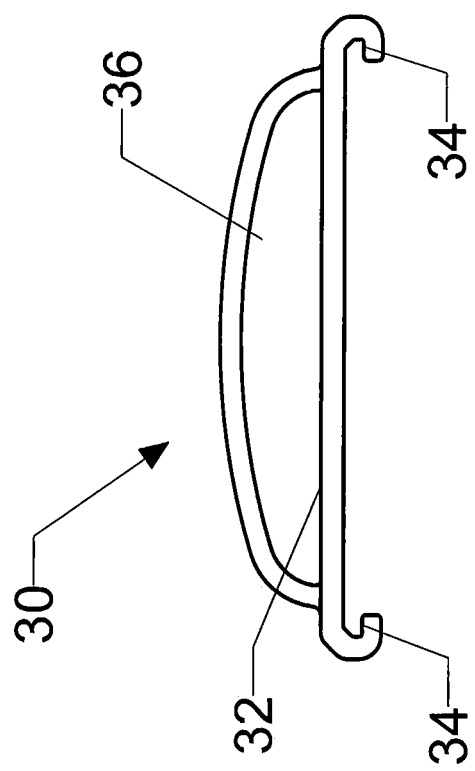
FIG. 4 is front view of a scraper bar for use with the measuring cup of FIG. 1.

These features of the preferred embodiment of the scraper bar 30 are best shown in FIGS. 4 and 5. Clearly shown is the finger grip 36 of the scraper bar 30, which the user will typically grasp in order to slide the scraper bar 30 from front to back over the measurement portion 12, leveling the contents of the measurement portion 12. Also shown is the flat bottom 32 of the scraper bar 30, which is that portion of the scraper bar 30 that actually scrapes away excess foodstuff that has mounded above the opening 16 of the measurement portion 12 of the measuring cup 10. Also clearly shown are the end portions of the scraper bar 30 that act as mating portions to the beads formed on the associated upper edges 24 of the side walls 18. This feature of the scraper bar 30 whose geometry mates with that of the bead rail to allow the scraper bar 30 to ride freely but securely on the upper edges 24 of the side walls 18 without detaching during use. It is understood that the mating geometry of both the engagement bead rail and the scraper bar may vary as long as the two maintain their ability to remain securely attached during use while at the same time the scraper bar is free to slide along the lengths of the respective rails. In the illustrated embodiment, each end of the scraper bar 30 is provided with a downwardly extending hook 34 which wraps around the bead formed on the associated upper edge 24.

The measuring cup 10 may conveniently be provided with a handle by which the user can securely grasp the entire device. In the illustrated, preferred embodiment, a handle 40 is secured to and extends from the rear wall 22 of the measurement portion 12.

The measuring cup of the invention can formed of any material of suitable strength and rigidity, thermoplastic materials being preferred.

In accordance with the provisions of the patent statutes, the invention has been described in what is considered to represent its preferred embodiments. However, it should be noted that the invention could be practiced otherwise than as specifically illustrated and described without departing from its spirit or scope.

What is claimed is:

1. A measuring cup comprising:
   a measurement portion that is sized to contain a precise amount of dry food-stuff, said measurement portion having rails integrally molded into the upper edges of two lateral side walls of the measurement portion, said rails having a geometry that mates with comparable geometry on the ends of a scraper bar to allow the scraper bar to affix to the rails in a slide-able fashion without detaching during use, and said rails having an integral feature at the most forward and rearward ends that prevent the scraper bar from sliding off the rails either forward or rearward during use; and
   the leveling scraper bar being adapted to remove excess dry food-stuff that has mounded in the measurement portion of the device, said scraper bar having a flat bottom portion to allow it to evenly scrape away excess mounded dry food-stuff, the two lateral ends of said scraper bar being configured to attach in a secure slide-able fashion to allow the scraper bar to slide easily across the upper portion of the two lateral rails of the measurement portion without detaching during use;
   wherein the upper edge of each of the side walls is provided with an enlarged bead that runs the length of the respective side wall; and
   wherein the first end of the scraper bar includes a downwardly extending first hook which wraps around the bead formed on the upper edge of one side wall and the second end of the scraper bar includes a downwardly extending second hook which wraps around the bead formed on the upper edge of the other of the side walls.

2. The measuring cup of claim 1, further comprising a handle extending from the rear wall of the measurement portion and that can used to manipulate the device.

3. A measuring cup comprising:
   a cup defined by a bottom wall joined to a front wall, a rear wall, and opposed side walls, the front wall, rear wall and side walls each having an upper edge that combine to define an upper opening in the cup; and
   a scraper bar having a first end and a second end, with the first end of the scraper engaging the upper edge of one of the side walls and the second end of the scraper bar engaging the upper edge of the other of the side walls such that the scraper bar is capable of translational movement both toward and away from the front wall, while movement of the scraper bar away from the bottom wall is restricted;
   wherein the upper edge of each of the side walls is provided with an enlarged bead that runs the length of the respective side wall; and
   wherein the first end of the scraper bar includes a downwardly extending first hook which wraps around the bead formed on the upper edge of one side wall and the second end of the scraper bar includes a downwardly extending second hook which wraps around the bead formed on the upper edge of the other of the side walls.

4. The measuring cup of claim 3, further comprising a physical stop formed at the front of the upper edge of at least one of the side walls.

5. The measuring cup of claim 3, further comprising a physical stop formed at the rear of the upper edge of at least one of the side walls.

6. The measuring cup of claim 3, further comprising a physical stop formed at the front of the upper edge of both of the side walls.

7. The measuring cup of claim 3, further comprising a physical stop formed at the front of the upper edge of both of the side walls, and a physical stop formed at the rear of the upper edge of both of the side walls.

* * * * *